United States Patent [19]

Manganaro

[11] 4,439,411

[45] Mar. 27, 1984

[54] PRODUCTION OF SODIUM HYDROSULFIDE

[75] Inventor: James L. Manganaro, Hightstown, N.J.

[73] Assignee: FMC Corporation, Philadelphia, Pa.

[21] Appl. No.: 227,307

[22] Filed: Jan. 22, 1981

[51] Int. Cl.³ .................... C01B 17/32; C01B 17/42
[52] U.S. Cl. ............................ 423/560; 423/561 A
[58] Field of Search ............... 423/560, 561 P, 512, 423/511

[56] References Cited

U.S. PATENT DOCUMENTS

| | | | |
|---|---|---|---|
| 2,154,917 | 4/1939 | Schneider | 423/560 |
| 2,252,867 | 8/1941 | Sconce et al. | 423/560 |
| 2,346,550 | 4/1944 | Border et al. | 423/560 |
| 2,376,433 | 5/1945 | Julien et al. | 423/560 |
| 2,376,434 | 5/1945 | Koenig | 423/560 |
| 2,376,435 | 5/1945 | Saddington | 423/560 |
| 2,409,392 | 10/1946 | Saddington | 423/560 |
| 2,662,000 | 12/1953 | Maschwitz | 423/560 |
| 3,839,548 | 10/1974 | Jackson | 423/560 |

OTHER PUBLICATIONS

Przemysl Chemiczny 45/5, 1966, pp. 271–272, by Czesiawa Bandrowska.

*Primary Examiner*—Gary P. Straub
*Attorney, Agent, or Firm*—Edwin B. Cave; Christopher Egolf

[57] ABSTRACT

Sodium hydrosulfide is continuously produced from the reaction of hydrogen sulfide and with sodium sulfide by continuously introducing an aqueous sodium sulfide solution into an unvented reaction chamber, which may be a tower or tank, while maintaining a source of gaseous hydrogen sulfide in pressure demand relationship with the solution in the chamber, and continuously withdrawing aqueous sodium hydrosulfide solution from the chamber.

8 Claims, No Drawings

PRODUCTION OF SODIUM HYDROSULFIDE

The present invention relates to the production of sodium hydrosulfide (NaSH) by the reaction of sodium sulfide (Na$_2$S) with hydrogen sulfide (H$_2$S).

Both batch and continuous processes are known in which sodium hydrosulfide is produced by the absorption of hydrogen sulfide into aqueous solutions containing sodium sulfide. In continuous procedures for carrying out this reaction, which have involved continuously introducing gases containing hydrogen sulfide and an aqueous solution containing sodium sulfide into a reaction chamber, such as a gas-liquid contact tower or a stirrer-equipped tank, and continuously withdrawing the product solution, the provision for obtaining as complete a conversion of sulfide to hydrosulfide as is feasible has been either by metering the relative amounts of sodium sulfide solution and hydrogen sulfide introduced or by continuously introducing an excess of hydrogen sulfide and allowing such excess to be continuously vented from the reaction chamber.

According to the present invention, continuous production of sodium hydrosulfide from sodium sulfide solutions and hydrogen sulfide is accomplished, without the necessity of providing and operating metering equipment or the necessity of accomodating such vented amounts of hazardous hydrogen sulfide, by using an reaction system including an unvented reaction chamber to contain the interacting hydrogen sulfide and solution of sodium sulfide and resulting sodium hydrosulfide, and by maintaining the source of hydrogen sulfide in continuous pressure demand relationship with the contents of the reaction chamber while continuously introducing an aqueous solution of sodium sulfide into the system and continuously withdrawing a corresponding portion of the hydrogen sulfide treated solution from the system, the rate of such introduction and withdrawal being adjusted to permit the desired degree of conversion of sodium sulfide to hydrosulfide.

The reaction chamber in which the process is carried out may be any enclosed gas-liquid contact apparatus, such as a tower or a stirrer-equipped tank, which is provided with a vent which is normally sealed but which has a pressure relief operable at a preset pressure above atmospheric. The supply of hydrogen sulfide gas to the chamber is regulated so as to be introduced at a controlled pressure below that at which the pressure release of the vent is operable. Thus the rate at which hydrogen sulfide is introduced is determined directly by the amount required to replace the consumed in reacting with the sodium sulfide. Although the pressure values are not critical and may vary substantially so long as the vent release pressure exceeds the normal hydrogen sulfide supply pressure, the vent release pressure can, for example, be about 2 pounds per square inch (or about 140 grams per square centimeter) above atmospheric and the hydrogen sulfide supply pressure can, for example, be about one pound per square inch (or about 70 grams per square centimeter) above atmospheric.

The hydrogen sulfide used in this process is essentially pure (99.5% H$_2$S by volume for instance) or commercially pure hydrogen sulfide, which may contain up to about 5 percent by volume of other gases essentially inert to the reaction. Whenever they are present, such gases inert to the reaction, which may for instance be primarily hydrogen or hydrocarbon gases, will accumulate in the free space of the unvented reaction chamber as the hydrogen sulfide is consumed in the reaction. When such gases have accumulated to the point that the partial pressure of the hydrogen sulfide in the reaction chamber is reduced sufficiently to slow unduly the progress of the reaction, it is necessary to open the vent momentarily to purge the system of the accumulated inert gas. The point at which venting becomes desirable depends upon the economics of the operation and may occur for instance when the inert gases constitute 10% to 25% of the total gas at the top of the reaction chamber. It will ordinarily be found convenient to vent the chamber at regular time intervals selected in accordance with the other operating parameters of the system to avoid excessive inert gas accumulation. Any vented gas is ordinarily sent to a flare after passing through a scrubbing device where its hydrogen sulfide content is absorbed in a suitable scrubbing liquid such as a periodically replenished sodium hydroxide solution, which may for instance have an initial concentration of about 20% by weight when charged.

The sodium sulfide is ordinarily supplied to the reaction chamber as an aqueous solution containing at least about 30% by weight of sodium sulfide in order to obtain a product having a desirably high concentration of hydrosulfide. Concentrations up to about 65% can conveniently be used. At any particular sodium sulfide concentration the temperature of the solution is maintained at a sufficiently high value to maintain the solution in a sufficiently fluid state for effective operation, ordinarily in an essentially completely liquid state, both in the supply equipment and in the reaction chamber.

It is ordinarily desirably to produce sodium hydrosulfide as an aqueous solution at either a concentration in the vicinity of about 40% to 45% by weight, at which it can be maintained in liquid form at about 70° C., or a concentration of about 65% to 75% by weight, at which it is normally provided in solid flake form.

Product containing 40% to 45% sodium hydrosulfide is obtained by the process of the present invention by introducing into the reaction system an aqueous solution containing about 35% (or about 30% to about 45%) sodium sulfide. Product containing about 55% to 75%, or more, of sodium hydrosulfide is obtained by introducing into the reaction system an aqueous solution of about 50% to 65%, advantageously about 60%, sodium sulfide and, if necessary, increasing the concentration of the hydrosulfide thus produced to the desired level by evaporating water. At lower hydrosulfide concentrations, evaporation of water without maintaining an adequate hydrogen sulfide pressure in contact with the solution tends to result in hydrolysis of the hydrosulfide with formation of sodium sulfide and evolution of hydrogen sulfide. But solutions having a concentration of 55% or more can be subjected to evaporation in a suitable vessel without maintaining a hydrogen sulfide pressure and without excessive decomposition of sodium hydrosulfide to sodium sulfide. Thus the appropriate procedure for producing a sodium hydrosulfide solution of, for instance, above 70% from a solution of sodium sulfide of, for instance, below 40% is to evaporate the sulfide solution to a concentration of, for instance, 60% and to convert this latter solution to a hydrosulfide solution of a concentration of, for instance, 68% and to evaporate this hydrosulfide solution to a concentration of 70% or higher.

In order to avoid accumulation of solids in the system, the liquids in the system are ordinarily maintained at temperatures at which they are free from undissolved sodium sulfide and sodium hydrosulfide. The sodium sulfide feed solutions are ordinarily delivered to the system at temperatures above 95° C., preferably above 100° C., and desirably at about 110° C. when the sodium sulfide concentration is at about 35%, or between 30% and 45%. When more concentrated solutions are fed to the system, they are introduced at higher temperatures. Solutions having a concentration of about 60% or between 50% and 65%, are introduced at temperatures of at least about 140° C., desirably about 150° C.

Under normal conditions of operation, the solution contacting the hydrogen sulfide in the reaction chamber has had the bulk of its sodium sulfide converted to the more soluble sodium hydrosulfide and can therefore be maintained at lower temperatures than the incoming sulfide solution without risk of accumulation of solids. When the reaction is carried out in a tower by introducing hydrogen sulfide into the lower portion of the tower and passing it countercurrent to solution introduced in the upper portion of the tower, the reacted solution withdrawn from the bottom of the tower is ordinarily continuously recirculated to the top of the tower. A portion of the solution leaving the bottom of the tower is continuously removed from the system as product after a steady state has been reached, and a corresponding quantity of sodium sulfide feed solution is continuously added to the recirculated solution being introduced at the top of the tower. The ratio of feed solution to recirculated solution is dependent upon the parameters of the system and the quantity of unreacted sodium sulfide which is tolerable in the product. Product solutions can be obtained which contain as little as 0.1% by weight of sodium sulfide but amounts up to 6% by weight can be tolerated for certain purposes. The ratio of feed solution to recirculated solution can be as low as 1:100 and can range up to 1:4 or higher with effective gas-liquid contact The higher ratio represents most effective use of equipment. A ratio of 1:5 will, under suitable operating conditions, be found an appropriate balance of the various requirements.

The operating temperature within the tower, operated as above, need not be maintained at temperatures higher than required to insure that all solids will remain in solution and can range from about 60° C. with the lower concentration sodium sulfide feed solutions to about 150° C. when the higher feed concentrations are used. Typical temperatures are 70° C. with 36% sodium sulfide feed solutions and 110° C. with 60% sodium sulfide feed solutions.

The tower is provided at its top with a vent which is maintained in a closed state except when the tower is being purged of accumulated gases inert to the reaction. A pressure relief is provided for the vent operable at any suitable pressure ordinarily not in excess of about 5 pounds per square inch (approximately 350 grams per square centimeter) above atmospheric and preferably operable at about 2 pounds per square inch (approximately 140 grams per square centimeter) above atmospheric. The hydrogen sulfide is introduced into the tower through a valve automatically controlled by a pressure sensing device located at the top of the tower so as to admit hydrogen sulfide in an amount such as to maintain the pressure at an appropriate value above atmospheric and below that which the vent emergency relief is operable. A suitable value of hydrogen sulfide pressure to be maintained within the tower is about one-half of the relief pressure. Hydrogen sulfide is thus admitted to the tower only as required to replace that which is consumed in the reaction with sodium sulfide.

In a typical operation for producing an approximately 45% by weight solution of sodium hydrosulfide, a 36% aqueous sodium sulfide solution at a temperature of about 110° C. is introduced as feed into the top of a packed tower at a rate of about 15 gallons per minute together with about 75 gallons per minute of recirculated solution previously withdrawn from the bottom of the tower and which is at a temperature of about 70° C. when introduced into the tower. The tower is equipped at its top with a pressure relief valve set at 2 pounds per square inch (approximately 140 grams per square centimeter) and with a pressure sensing device set at one pound per square inch (approximately 70 grams per square centimeter) which controls a valve in a line supplying gaseous hydrogen sulfide at about 100° C. to the bottom of the tower so as to maintain the gas pressure at the top of the tower at the set value of the pressure sensing device. Solution withdrawn from the bottom of the tower is stored at a temperature of about 70° C. in a tank from which is drawn the solution which is recirculated to the tower and from which is also drawn about 15 gallons per minute of solution as product.

The tower vent is momentarily opened about twice an hour and the vented gases are passed to a scrubber where essentially all the hydrogen sulfide contained therein is absorbed in an aqueous sodium hydroxide scrubber solution containing initially about 20% by weight of sodium hydroxide. The unabsorbed gases are passed to a flare. When the scrubber solution has been reduced to a sodium hydroxide concentration of about 3% by reaction with the hydrogen sulfide, at least a portion of the solution is withdrawn from the scrubber system and replaced by fresh 20% sodium hydroxide solution. The withdrawn scrubber solution, containing about 14.5% sodium sulfide can be concentrated by evaporation for introduction into the reaction tower.

A typical production of an approximately 70% to 74% by weight sodium hydrosulfide flake will be carried out in a similar manner except that the feed solution introduced into the tower is a 60% by weight aqueous solution of sodium sulfide at a temperature of about 150° C. and the product solution containing about 64% sodium hydrosulfide is concentrated in a vacuum evaporator to 70% to 74% and converted to flake in a flaker.

In the practice of the present invention wherein the sodium sulfide solution is agitated in contact with the hydrogen sulfide in a tank, in place of a tower, the rate of continuous introduction of sodium sulfide solution into and continuous withdrawal of product solution from the tank is controlled with respect to tank capacity so as to provide the necessary residence time to produce the required degree of conversion to hydrosulfide. The tank, like the tower, is operated in a normally unvented condition and is equipped with a pressure relief valve and a pressure sensing device controlling the hydrogen sulfide supply valve so as to admit only so much hydrogen sulfide as is required to maintain the preset gas pressure above the solution in the tank as hydrogen sulfide is consumed in the reaction. Agitation of the solution in the tank so as to expose continually new solution surfaces to the gas is ordinarily accomplished by means of a stirrer. The hydrogen sulfide can be introduced either below or above the surface of the solution. The required residence time depends upon the degree of agitation and the amount of unreacted sodium sulfide which can be tolerated in the product.

I claim:

1. A continuous process for producing sodium hydrosulfide by the reaction of gaseous hydrogen sulfide with a solution of sodium sulfide comprising establishing, in a closed reaction system including a reaction chamber, an aqueous product solution resulting from the reaction of hydrogen sulfide with an aqueous solution of sodium sulfide and maintaining said reaction system in an unvented condition while maintaining a source of hydrogen sulfide, containing one or more other gases inert to the reaction in an amount not more than about 5 percent, in pressure demand relationship with said product solution in said reaction chamber and while continuously introducing a quantity of aqueous sodium sulfide feed solution into said reaction system and continuously withdrawing a corresponding quantity of product solution from said system, and periodically venting the reaction system to purge the system of accumulated gases which do not react with the sodium sulfide solution.

2. The process of claim 1 wherein the hydrogen sulfide has a purity of about 99.5%.

3. The process of claim 1 or 2 in which the reaction chamber contains a pressure sensing device in its upper portion and the source of hydrogen sulfide is connected to the reaction chamber through a valve controlled by said pressure sensitive device to admit only an amount of hydrogen sulfide to maintain a fixed gas pressure within the reaction chamber.

4. The process of claim 3 wherein the reaction chamber is a stirrer-equipped tank.

5. The process of claim 3 wherein said fixed gas pressure is approximately one pound per square inch above atmospheric.

6. The process of claim 3 wherein the reaction chamber is an absorption tower into the upper portion of which the feed solution is introduced together with a portion of the solution withdrawn from the bottom of the tower and into the bottom portion of which the hydrogen sulfide is introduced.

7. The process of claim 6 in which the feed solution is an aqueous solution of sodium sulfide having a concentration of from about 40 percent to about 45 percent by weight and is supplied at a temperature of at least 95° C.

8. The process of claim 6 in which the feed solution is an aqueous solution of sodium sulfide having a concentration of from about 50 percent to about 65 percent by weight and is supplied at a temperature of at least 140° C.

* * * * *